United States Patent
Takehisa et al.

[15] 3,676,419

[45] July 11, 1972

[54] PROCESS FOR PRODUCING FINE POLYETHYLENE POWDER

[72] Inventors: Masaaki Takehisa; Shiro Senrui; Hayato Nakajima, all of Gunma-ken, Japan

[73] Assignee: Japan Atomic Energy Research Institute, Tokyo, Japan

[22] Filed: Feb. 28, 1969

[21] Appl. No.: 803,990

[30] Foreign Application Priority Data

March 4, 1968 Japan....................................43/13630

[52] U.S. Cl. .......................................260/94.9 F
[51] Int. Cl. .......................................C08f 47/02
[58] Field of Search...........................260/94.9 F

[56] References Cited

UNITED STATES PATENTS 3,553,187    1/1971    Takehisa et al.......................260/94.9

*Primary Examiner*—Joseph L. Schofer
*Assistant Examiner*—Stanford M. Levin
*Attorney*—Kurt Kelman

[57] ABSTRACT

It has been found that a fine powder of polyethylene, the average particle size of which is not more than 100 microns in diameter, is obtained by polymerizing ethylene at a temperature lower than the melting point of the produced polyethylene, by means of irradiation of an ionizing radiation or free radical initiator, dispersing the thus produced powder polyethylene in a water-miscible liquid dispersing medium which wets the polyethylene but does not substantially dissolve it, and the surface tension of which is not more than 32.5 dyne/cm, to dissociate the agglomerated polyethylene powder particles washing the dissociated polyethylene powder particles with water, and drying the particles.

3 Claims, No Drawings

PROCESS FOR PRODUCING FINE POLYETHYLENE POWDER

BACKGROUND OF THE INVENTION

This invention relates to a process for producing a fine powder of polyethylene the average particle size of which is not more than 100 microns in diameter, which we call "fine-powder polyethylene" hereinafter.

It was known prior to this invention that polyethylene is produced in powder form when ethylene is polymerized under pressurization in the gaseous phase, or in a liquid or gas-liquid mixed phase, in the presence of a solvent in which the produced polyethylene does not dissolve, at a temperature lower than the melting point of the produced polyethylene, by means of irradiation of an ionizing radiation or a free radical initiator. And it was known, too, that the thus produced powdery polyethylene has properties superior to those of the polyethylene powders which are produced from polyethylene of the prior art by secondary mechanical or physicochemical pulverizing treatment; and we call this powdery polyethylene "powder polyethylene" in order to distinguish it from the above-mentioned conventional polyethylene powder.

However, this powder polyethylene still has some defects. The powder polyethylene (produced in the gaseous phase, liquid phase or gas-liquid mixed phase, and separated from the monomeric ethylene or the liquid medium) easily agglomerates, and the original fine powder state cannot be easily regained by any simple method. It is thought that such agglomeration is caused by the co-existing oligomer of ethylene. Therefore, the particles of the so-called "powder polyethylene" are not particles as polymerized from the gaseous phase or liquid or gas-liquid mixed phase in which the polyethylene does not dissolve, but more or less agglomerated particles, and thus the average particle size of the hitherto known "powder polyethylene" is of the order of 200 – 300 microns in diameter, and a fine powder of polyethylene not more than 100 microns in diameter has never been produced.

CROSS REFERENCE TO CO-PENDING RELATED APPLICATION

The invention of this application is closely related to the invention of U.S. Pat. No. 3,553,187.

SUMMARY OF THE INVENTION

The purpose of this invention is to provide a process for producing fine powder of polyethylene the average particle size of which is not more than 100 microns. And the purpose is achieved by polymerizing ethylene in the presence of a solvent in which the produced polyethylene does not dissolve, at a temperature lower than the melting point of the produced polyethylene, by means of irradiation of an ionizing radiation or a free radical initiator, dispersing the thus produced powder polyethylene in a liquid organic compound or an aqueous solution thereof which has a surface tension not more than 32.5 dyne/cm, and wets the surface of polyethylene, dissolves in water in an amount of 5g/100 ml or more, and does not substantially dissolve polyethylene, thereafter separating said dispersion medium, and washing the separated powder with water.

The above-mentioned organic compound includes an alkanol, a ketone and an ether having 1 – 4 carbon atoms, a fatty acid having 1 – 4 carbon atoms, etc.

The liquid which wets the produced powder polyethylene and subsequently disperses it must have a surface tension of not more than 32.5 dyne/cm. This was established by our coworkers including one of us and is described in the specification of the above-mentioned U.S. Pat. application Ser. No. 687619.

The liquid organic compound applied to the process of this invention must have solubility of at least 5g/100 ml in water. If the solubility in water of the liquid is less than this, it is difficult to remove the liquid from the polyethylene powder only by washing several times with water. Therefore, it is practically impossible to use a liquid the water-solubility of which is less than the above-described critical value in the industrial application of this invention, though removal of such a liquid from the polyethylene powder is theoretically possible.

Some examples of the liquid applicable to the process of this invention are shown in Table 1.

TABLE 1

| Inherent Liquid surface tension (dyne/cm) | | Solubility in water (g/100ml) | Surface tension of water solution (dyne/cm-wt% conc.) |
|---|---|---|---|
| Methanol | 22.6 | ∞ | 32.5–54 |
| Ethanol | 22.6 | ∞ | 32.5–32 |
| Isopropanol | 21.4 | ∞ | 32.5–14 |
| n-Propanol | 23.7 | ∞ | 32.5–11.5 |
| n-Butanol | 24.6 | 8 | 32.5–5 |
| sec-Butanol | 23.5 | 12.5 | 32.5–6 |
| tert-Butanol | 19.3 | ∞ | 32.5–6 |
| Acetone | 23.7 | ∞ | 32.5–49 |
| Ethyl ether | 17.0 | 7.5 | – |
| Acetic acid | 27.7 | ∞ | 32.5–76 |
| Propionic acid | 26.0 | ∞ | 32.5–51 |

All these organic liquids can be used for the process of this invention economically on an industrial scale.

Some of these liquids can be used in the step of polymerization of ethylene as the solvent to form a liquid phase or a gas-liquid mixed phase together with ethylene. If these liquids are used in this way, the purpose of this invention is achieved by simply washing the slurry of powder polyethylene resulting from the polymerization step with water.

The fine-powder polyethylene produced in accordance with the process of this invention has an average particle size of not more than 100 microns, and does not agglomerate. Because of its large specific surface area, the fine-powder polyethylene can be used as a very active adsorbent for organic vapor and liquids. It can be used as a blending material for other plastic materials such as polyester resin in order to improve their physical properties. The fine-powder polyethylene is suitable for coating metal substrates by depositing it thereon from a dispersion thereof in a liquid or from the free powder state.

DETAILED DESCRIPTION OF THE INVENTION

Now the invention is illustrated by way of working examples, but it will be understood that the invention is by no means restricted to these specific modes of working.

Example 1

A partly agglomerated powder polyethylene, the mean molecular weight of which is $8.4 \times 10^4$, and the density of which is 0.933 g/ml, was produced by circulating ethylene through a reactor having a capacity of 10 liters at a flow rate of 9 kg/hr at 30° C, the pressure inside the reactor being maintained at 400 kg/cm² all the time; and irradiating the ethylene in the reactor with gamma radiation from cobalt-60 of $10^5$ Curies at a dose rate of $3.7 \times 10^5$ rad./hr. This powder polyethylene (, which is hereinafter called "polyethylene A" ) was made finer by the process of this invention.

Twenty-five grams of polyethylene A was dispersed in 1 liter of methanol by means of a small mixer, and thereafter was separated from the methanol by filtration. The thus treated radiation-polymerized polyethylene A was then dispersed in water and filtered so as to remove methanol, and was dried in air kept at 80° C. The dried radiation-polymerized polyethylene A was, without any pulverizing treatment applied, subjected to screening analysis by using the ASTM standard sieve and a Ro-tap type sieve shaker for 20 minutes in accordance with the method of JIS (Japanese Industrial Standards) 6002. The result is shown in Table 2.

TABLE 2

| No. of sieve (mesh) | Opening of the sieve (microns) | Wt.% of fine powder |
|---|---|---|
| 45–120 | 350–125 | 4.24 |
| 120–170 | 125–88 | 7.63 |
| 170–230 | 88–62 | 37.30 |
| 230–325 | 62–44 | 41.10 |

325 up    not more than 44    9.75
Average particle size: 70.0 microns

There was no fraction remaining on the sieve No. 45.

Example 2

In accordance with the operation as described in Example 1, radiation-polymerized polyethylene A was made finer by using ethyl ether instead of methanol. The water-solubility of ethyl ether is 7.5 g/100 ml at 20° C. The result is shown in Table 3.

TABLE 3

| No. of sieve (mesh) | Opening of the sieve (microns) | Wt.% of fine powder |
|---|---|---|
| 45–120 | 350–125 | 3.79 |
| 120–170 | 125–88 | 9.51 |
| 170–230 | 88–62 | 67.00 |
| 230–325 | 62–44 | 15.79 |
| passing 325 | not more than 44 | 3.92 |

Average particle size: 79.3 microns

There was no fraction remaining on the sieve No. 45.

Example 3

In accordance with the operation as described in Example 1, radiation-polymerized polyethylene A was made finer by using 50 weight percent aqueous solution of acetone instead of methanol. The surface tension of the 50 weight percent solution of acetone is 30.4 dyne/cm (25° C). The result is shown in Table 4. The critical surface tension of a liquid for wetting polyethylene is 32.5 dyne/cm.

TABLE 4

| No. of sieve (mesh) | Opening of the sieve (microns) | Wt. % of fine powder |
|---|---|---|
| 45–120 | 350–125 | 9.16 |
| 120–170 | 125–88 | 17.00 |
| 170–230 | 88–62 | 25.70 |
| 230–325 | 66–44 | 22.77 |
| Passing 325 | not more than 44 | 25.40 |

Average particle size: 76.2 microns

There was no fraction remaining on the sieve No. 45.

Example 4

Ethylene was circulated through a reactor having a capacity of 10 liters at a flow rate of 27 kg/hr at 30° C while the pressure inside the reactor was maintained at 400 kg/cm², and at the same time a 40 weight percent acqueous solution of tert-butanol was circulated through said reactor at a flow rate of 60 kg/hr. The content of the reactor was subjected to the irradiation of gamma radiation from a cobalt-60 source of $10^5$ Curies at the dose rate of $2.0 \times 10^5$ rad/hr. Thus powder polyethylene was produced and taken out of the reactor in the form of a slurry comprising suspended powder polyethylene and tert-butanol-water medium. The molecular weight of the polyethylene was $2 \times 10^4$, and its density was 0.940 g/cm³. This powder polyethylene is hereinafter called polyethylene B.

A small amount of the polyethylene B obtained in the form of slurry in 50 weight percent aqueous solution of tert-butanol was filtered, washed with water and dried in the same way as in Example 1. The thus obtained fine-powder polyethylene was subjected to the sieving analysis as in Example 1. The result is shown in Table 5. Incidentally the polyethylene B directly separated and dried from the slurry coagulates and gives partly agglomerated so-called powder polyethylene.

TABLE 5

| No. of sieve (mesh) | Opening of the sieve (microns) | Wt. % of fine powder |
|---|---|---|
| 45–120 | 350–125 | 0.50 |
| 120–170 | 125–88 | 3.73 |
| 170–230 | 88–62 | 33.51 |
| 230–325 | 62–44 | 34.82 |
| Passing 325 | not more than 44 | 27.42 |

Average particle size: 55.3 microns

There was no fraction remaining on the sieve No. 45.

Example 5

Ethylene was charged into a reactor having a capacity of 500 ml up to a pressure of 400 kg/cm² at 40° C, and was polymerized by injecting azo-bis-isobutyronitrile as the free radical initiator. Agglomerated powder polyethylene having a molecular weight of $3 \times 10^5$ and a density of 0.931 g/cm³ was obtained. This is hereinafter called polyethylene C.

Polyethylene C was made finer in the same way as in Example 1. That is to say, 25 g of polyethylene C was dispersed in 1 liter of methanol by means of a small mixer, and separated by filtration and washed with water and dried as in Example 1. The result is shown in Table 6.

TABLE 6

| No. of sieve (mesh) | Opening of the sieve (microns) | Wt. % of fine powder |
|---|---|---|
| 45–120 | 350–125 | 1.21 |
| 120–170 | 125–88 | 10.83 |
| 170–230 | 88–62 | 53.20 |
| 230–325 | 62–44 | 21.47 |
| Passing 325 | not more than 44 | 13.30 |

Average particle size: 68.6 microns

There was no fraction remaining on the sieve No. 45

Example 6

Through a tubular reactor comprising a stainless steel tube 10 mm in inside diameter, 20 mm in outside diameter, 90 m in length, and 7 liters in volume coiled into a spiral 1 m in diameter, a methanol-ethylene mixture (43.5 weight percent ethylene) was passed at a flow speed of 4.5 m/min at the pressure of 400 kg/cm², and the passing ethylene was irradiated with gamma radiation from a cobalt-60 source of $10^5$ Curies placed in the center of the coil at the dose rate of $2.5 \times 10^5$ rad/hr at 20° C. A powder polyethylene, the molecular weight of which is $2.1 \times 10^4$, and the density of which is 0.955 g/cm³, was obtained in the state of slurry. This powder polyethylene is hereinafter called polyethylene D.

The polyethylene D obtained in the form of slurry in methanol was separated by filtration, and a small amount thereof was washed with water and dried as in Example 1. The result of the sieving analysis of this product as carried out as in Example 1 is shown in Table 7.

TABLE 7

| No. of sieve (mesh) | Opening of the sieve (microns) | Wt. % of fine powder |
|---|---|---|
| 45–120 | 350–125 | 0.30 |
| 120–170 | 125–88 | 2.40 |
| 170–230 | 88–62 | 28.25 |
| 230–325 | 62–44 | 38.20 |
| Passing 325 | not more than 44 | 30.85 |

Average particle size: 51.5 microns

There was no fraction remaining on the sieve No. 45.

By way of comparison, some examples are shown in which the so-called powder polyethylene was treated in the same way as in the above examples but using liquids other than the liquid as defined above.

Example 7

Twenty-five grams of the same polyethylene A as used in Example 1 was dispersed in 1 liter of n-hexane by means of a small mixer, and was separated from the liquid by filtration. The thus treated powder polyethylene was then dispersed in water by the same mixer so as to remove hexane, and was filtered and dried in an air bath kept at 80° C. The dried powder polyethylene was in the agglomerated state and was not fine powder. The surface tension of n-hexane is 18.4 dyne/cm at 20° C, and its water-solubility is 0.014 g/100 ml (15° C); that is, the liquid is scarcely soluble in water, and therefore, it is not easily removed from the polyethylene powder by simple washing treatment.

Example 8

The operation of Example 7 was repeated by using isobutyl acetate instead of n-hexane. The resulting powder polyethylene was in the agglomerated state and was not fine powder.

The surface tension of isobutyl acetate is 23.7 dyne/cm (20° C), and its solubility in water is 0.63 g/100 cc (25° C). This liquid is not easily removed by washing with water, either.

Example 9

The operation of Example 7 was repeated by using 1 liter of 0.05 percent (by weight) water solution of lauryl alcohol. The resulting powder polyethylene was not remarkably agglomerated but apparently more coarse than those obtained in Examples 1 – 6. This is because the surface tension of the washing solution used in this example is 42 dyne/cm, which is greater than the critical value 32.5 dyne/cm for a liquid to wet the surface of polyethylene, and dispersion is not well effected.

What is claimed is:

1. In a process for producing a fine polyethylene powder having an average particle size of no more than 100 microns in diameter, wherein ethylene is polymerized at a temperature lower than the melting point of the produced polyethylene by means of ionizing radiation or a free radical initiator, the improvement consisting essentially of dispersing the thus produced polyethylene agglomerates in a dispersing medium consisting of an aqueous solution of an organic compound, said organic compound being a ketone, or an ether, each having 1 to 4 carbon atoms, until the agglomerates of polyethylene are substantially dissociated into fine powder having the said average particle size, said dispersing medium having a surface tension of no more than 32.5 dyne/cm, wetting the surface of the polyethylene without substantially dissolving the same; separating the dispersing medium from the polyethylene; washing the separated polyethylene powder with water to remove residual dispersing medium therefrom; and drying the washed powder at a temperature lower than the melting point of the polyethylene powder.

2. The process of claim 1 wherein the organic compound is acetone, or ethyl ether.

3. The process of claim 1 wherein the polymerization is carried out in a liquid or gas-liquid mixed phase in the presence of the dispersing medium as the polymerization medium, and said dispersion takes place as the polymerization proceeds.

* * * * *